United States Patent
Ding et al.

(10) Patent No.: US 10,810,202 B2
(45) Date of Patent: Oct. 20, 2020

(54) EXECUTION PLAN STITCHING

(71) Applicant: Microsoft Technology Licensing, LLC, Redmond, WA (US)

(72) Inventors: Bailu Ding, Bellevue, WA (US); Sudipto Das, Redmond, WA (US); Wentao Wu, Bellevue, WA (US); Surajit Chaudhuri, Redmond, WA (US); Vivek R Narasayya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 245 days.

(21) Appl. No.: 16/008,905

(22) Filed: Jun. 14, 2018

(65) Prior Publication Data

US 2019/0384844 A1    Dec. 19, 2019

(51) Int. Cl.
*G06F 16/00* (2019.01)
*G06F 16/2453* (2019.01)

(52) U.S. Cl.
CPC .. *G06F 16/24544* (2019.01); *G06F 16/24535* (2019.01); *G06F 16/24539* (2019.01)

(58) Field of Classification Search
CPC ......... G06F 16/24544; G06F 16/24535; G06F 16/24539; G06F 16/24524; G06F 16/00; G06F 16/951; G06F 16/4393; G06F 16/9535; G06F 17/958; G06F 17/30867;
(Continued)

(56) References Cited

U.S. PATENT DOCUMENTS

| 2004/0220923 | A1* | 11/2004 | Nica | G06F 16/24544 |
| 2005/0071331 | A1* | 3/2005 | Gao | G06F 16/24547 |
| 2005/0262046 | A1* | 11/2005 | Day | G06F 16/217 |

(Continued)

OTHER PUBLICATIONS

"Access Plan in IBM DB2", Retrieved from: https://www.ibm.com/support/knowledgecenter/en/SSEPGG_11.1.0/com.ibm.db2.luw.admin.explain.doc/doc/c0021356.html, Retrieved on: Feb. 22, 2018, 3 Pages.

(Continued)

*Primary Examiner* — Anh Ly
(74) *Attorney, Agent, or Firm* — Schwegman Lundberg & Woessner, P.A.

(57) ABSTRACT

Systems, methods, and computer-executable instructions for creating a query execution plan for a query of a database includes receiving, from the database, a set of previously executed query execution plans for the query. Each previously-executed query execution plans includes subplans. Each subplan indicates a tree of physical operators. Physical operators that executed in the set of previously-executed query execution plans are determined. For each physical operator, an execution cost based is determined. Invalid physical operators from the previously-executed query execution plans that are invalid for the database are removed. Equivalent subplans from the previously-executed query execution plans are identified based on physical properties and logical expressions of the subplans. A constrained search space is created based on the equivalent subplans. A query execution plan for the query is constructed from the constrained search space based on the execution cost. The constructed query execution plan is not within the previously-executed query execution plans.

20 Claims, 7 Drawing Sheets

(58) Field of Classification Search
CPC ........ G06N 20/00; G06N 7/005; G06Q 10/06; G06Q 30/0641
See application file for complete search history.

(56) References Cited

U.S. PATENT DOCUMENTS

| | | | |
|---|---|---|---|
| 2006/0031189 A1* | 2/2006 | Muras | G06F 16/24524 |
| 2008/0177694 A1* | 7/2008 | Chaudhuri | G06F 16/24542 |
| 2009/0256024 A1* | 10/2009 | Rastegar | F41G 7/007 244/3.11 |
| 2009/0319475 A1* | 12/2009 | Bestgen | G06F 16/2453 |
| 2009/0327254 A1* | 12/2009 | Bruno | G06F 16/22 |
| 2010/0005340 A1* | 1/2010 | Belknap | G06F 11/3688 714/37 |
| 2010/0131490 A1* | 5/2010 | Lamb | G06F 16/24542 707/714 |
| 2010/0306188 A1* | 12/2010 | Cunningham | G06F 16/24542 707/713 |
| 2012/0130988 A1* | 5/2012 | Nica | G06F 16/24542 707/718 |
| 2018/0349404 A1* | 12/2018 | Noh | G06F 16/244 |

OTHER PUBLICATIONS

"Azure SQL Database", Retreived from: https://web.archive.org/web/20180314165322/https://azure.microsoft.com/en-us/services/sql-database/, Mar. 14, 2018, 22 Pages.

"Creating and deploying optimization hints for SQL statements that run on DB2 for z/OS", Retreived from: https://www.ibm.com/support/knowledgecenter/SS62YD_4.1.1/com.ibm.datatools.qrytune.sngqry.doc/topics/reviewingvph.html, Retreived on: Feb. 22, 2018, 7 Pages.

"Database Performance Tuning Guide", Retreived from: https://web.archive.org/web/20171006014956/http://docs.oracle.com:80/cd/B19306_01/server.102/b14211/hintsref.htm#i8327https://docs.oracle.com/cd/B19306_01/server.102/b14211/hintsref.htm, Oct. 6, 2017, 15 Pages.

"Microsoft SQL Server Query Store", Retreived from: https://docs.microsoft.com/en-us/sql/relational-databases/performance/monitoring-performance-by-using-the-query-store?view=sql-server-2017, Oct. 26, 2017, 27 Pages.

"Microsoft SQL Server Use Plan Query Hint", Retreived from: https://docs.microsoft.com/en-us/previous-versions/sql/sql-server-2008-r2/ms186954(v=sql.105), Oct. 4, 2012, 11 Pages.

"Plan Guides", Retreived from: https://docs.microsoft.com/en-us/sql/relational-databases/automatic-tuning/automatic-tuning?view=sql-server-2017, Mar. 14, 2017, 10 Pages.

"SQL Plan Management with Oracle Database 12c", In Oracle White Paper, Jan. 2017, 24 Pages.

"TPC Benchmark DS: Standard Specification v2.6.0", Retreived from: https://web.archive.org/web/20171125024055/http:/www.tpc.org/tpcds/http:/www.tpc.org/tpcds/, Nov. 25, 2017, 1 Page.

"TPC-DS Tools", Retreived from: http://www.tpc.org/tpc_documents_current_versions/current_specifications.asp, Feb. 2018, pp. 1-138.

Aboulnaga, et al., "Self-tuning histograms: Building histograms without looking at data", In Proceedings of ACM SIGMOD international conference on Management of data, May 31, 1999, pp. 181-192.

Akdere, et al., "Learning-based query performance modeling and prediction", In Proceedings of IEEE 28th International Conference on Data Engineering, Apr. 1, 2012, 12 Pages.

Bruno, et al., "Automatic physical database tuning: a relaxation-based approach", In Proceedings of ACM SIGMOD international conference on Management of data, Jun. 14, 2005, pp. 227-238.

Bruno, et al., "Exploiting statistics on query expressions for optimization", In Proceedings of ACM SIGMOD International Conference on Management of Data, Jun. 4, 2002, pp. 263-274.

Bruno, et al., "Power hints for query optimization", In Proceedings of International Conference on Data Engineering, Jan. 2009, 12 Pages.

Bruno, et al., "Stholes: A multidimensional workload-aware histogram", In Proceedings of the ACM SIGMOD international conference on Management of data, May 21, 2001, pp. 211-222.

Chaudhuri, et al., "A pay-as-you-go framework for query execution feedback", In Proceedings of the VLDB Endowment, Aug. 23, 2008, pp. 1141-1152.

Chaudhuri, et al., "To Tune or not to Tune? A Lightweight Physical Design Alerter", In Proceedings of the 32nd international conference on Very large data bases, Sep. 12, 2006, 12 Pages.

Chen, et al., "Adaptive selectivity estimation using query feedback", In Proceedings of the ACM SIGMOD International Conference on Management of Data, May 24, 1994, pp. 161-172.

Papadomanolakis, et al., "Efficient use of the query optimizer for automated database design", In Proceedings of the 33rd international conference on Very large data bases, Sep. 23, 2007, pp. 1093-1104.

Ganapathi, et al., "Predicting multiple metrics for queries: Better decisions enabled", In Proceedings of the IEEE International Conference on Data Engineering, May 29, 2009, 12 Pages.

Herodotou, et al., "Xplus: A sql-tuning-aware query optimizer", In Proceedings of the VLDB Endowment, vol. 3, Issue 1, Sep. 2010, pp. 1149-1160.

Ioannidis, et al., "Containment of conjunctive queries: Beyond relations as sets", In Journal of ACM Transactions on Database Systems, vol. 20, Issue 3, Sep. 1995, pp. 288-324.

Laudenschlager, et al., "Hints (Transact-SQL)—Query", Retreived from: https://docs.microsoft.com/en-us/sql/t-sql/queries/hints-transact-sql-query?view=sql-server-2017, May 14, 2018, 26 Pages.

Laudenschlager, et al., "Statistics XML in Microsoft SQL Server", Retreived from: https://docs.microsoft.com/en-us/sql/t-sql/statements/set-statistics-xml-transact-sql?view=sql-server-2017, Jun. 10, 2016, 6 Pages.

Leis, et al., "How Good Are Query Optimizers, Really?", In Proceedings of VLDB Endowment, vol. 9, Nov. 2015, pp. 204-215.

Li, et al., "Robust estimation of resource consumption for SQL queries using statistical techniques", In Proceedings of the VLDB Endowment, vol. 5, Issue 11, Aug. 27, 2012, pp. 1555-1566.

Markl, et al., "Consistent selectivity estimation via maximum entropy", In International Journal on Very Large Data Bases, vol. 16, Issue 1, Jan. 2007, pp. 55-76.

Popovic, Jovan, "Automatic index management in Azure SQL database", Retreived from: https://blogs.msdn.microsoft.com/sqlserverstorageengine/2017/05/16/automatic-index-management-in-azure-sql-db/, May 16, 2017, 5 Pages.

Popovic, et al., "Automatic tuning", Retreived from: https://docs.microsoft.com/en-us/sql/relational-databases/automatic-tuning/automatic-tuning?view=sql-server-2017, Aug. 16, 2017, 7 Pages.

Selinger, et al., "Access path selection in a relational database management system", In Proceedings of the ACM SIGMOD International conference on Management of data, May 30, 1979, pp. 23-34.

Stillger, et al., "LEO—DB2's Learning Optimizer", In Proceedings of the 27th International Conference on Very Large Data Bases, vol. 1, Sep. 11, 2001, 10 Pages.

Hulgeri, et al., "AniPQO: Almost non-intrusive parametric query optimization for nonlinear cost functions", In Proceedings of the 29th international conference on Very large data bases—vol. 29, Sep. 9, 2003, 12 Pages.

Wu, et al., "Predicting query execution time: Are optimizer cost models really unusable?", In Proceedings of IEEE 29th International Conference on Data Engineering, Apr. 8, 2013, pp. 1081-1092.

Wu, et al., "Sampling-based query re-optimization", In Proceedings of the International Conference on Management of Data, Jun. 26, 2016, pp. 1721-1736.

* cited by examiner

EXECUTION PLAN STITCHING

BACKGROUND

A query execution plan includes operations that implements a query. In an example, the query execution plan may be a directed acyclic graph of operators. A query execution plan may be optimized by a query optimizer in an attempt to create an efficient way to implement the query. Optimizations may include using indexes, changing the order of operations, etc. A query execution plan may change for various reasons, such as when indexes and statistics are created or dropped, when a stored procedure is recompiled, or based on query hints. Query execution plan changes may be frequent in an automatically-tuned database system. Some database systems may have tens of thousands of indexes that are created and dropped over a period time, resulting in hundreds of thousands of instances where the optimizer chooses multiple query execution plans for the same query.

The query optimizer often makes good use of the newly-created indexes and statistics, and the resulting new query execution plan improves in execution cost. At times, however, the latest query execution plan chosen by the optimizer has significantly higher execution cost compared to previously-executed plans that are still valid, i.e., a query execution plan regresses. A query execution plan regresses when a selected query execution plan is slower than a previously used query execution plan. In many cases, cheaper previous plans are still valid, i.e., the plans are still executable in the database's current configuration.

The problem of plan regressions is difficult to debug. Debugging becomes even more challenging when query execution plans change regularly on a large scale, such as in a cloud database service with automatic index tuning. Given such a large-scale production environment, detecting and correcting query execution plan regressions in an automated manner becomes crucial. Such automated correction techniques should have low risk of making execution costs worse due to the automated correction action.

Current commercial database management systems (DBMSs) have recognized the importance of the regression problem. Some DBMSs include an automatic plan correction (APC) feature that automatically detects and corrects plan regressions. In these DBMSs, APC continuously monitors aggregated execution statistics of query execution plans. When a query execution plan has a statistically-significant worse execution cost compared to an earlier query execution plan of the same query observed in recent history that is valid, the server automatically forces the optimizer to execute the query with the valid cheaper older query execution plan. When database sizes and data distributions have not significantly changed from the time when previous plans in recent history were executed, reverting to the cheaper previously-executed plan may correct the regression. Additional query execution plans, however, may be available that are more efficient than the cheaper previously-executed plan.

DETAILED DESCRIPTION

Known APC features are attractive in a production setting due to their low risk, since the query execution plan selection is based on observed execution cost. However, reversion-based plan correction is restricted to choosing one overall cheapest query execution plan from the set of previously-executed and valid query execution plans. Each query execution plan, however, may include efficient subplans that may be combined with subplans from other query execution plans to create a more efficient and valid query execution plan. With operator-level execution cost statistics, efficient subplans from other query execution plans in the previously executed query execution plan set may be identified, even if the overall query execution plan is not the cheapest. Ignoring these subplans leaves behind significant opportunities of further plan improvement with a comparable low risk.

Various embodiments described herein take into account valid subplans to automatically and opportunistically stitch efficient subplans of previously-executed query execution plans into a valid new query execution plan that can be significantly cheaper than any individual previously-executed query execution plan. Using such stitched query execution plans may lead to a reduction of execution cost of at least two orders of magnitude, compared to reverting to the cheapest previously-executed plan. Execution cost may include metrics such as, but not limited to, CPU time, logical reads, server memory use, network traffic, or any combination of these metrics.

Accordingly, various embodiments address a problem in large scale database systems where indexes, views, and query execution plans change regularly and rapidly. Instead of recalculating a new query execution plan or running an old query execution plan, embodiments combine efficient subplans of previously-executed plans of the same query into a valid new query execution plan that may be significantly cheaper than any individual previously-executed query execution plan. In this manner, the described techniques achieve a variety of technical advantages including, but not limited to, decreased query execution cost, reduced processor load, memory conservation, and network traffic conservation.

Figure 1A:
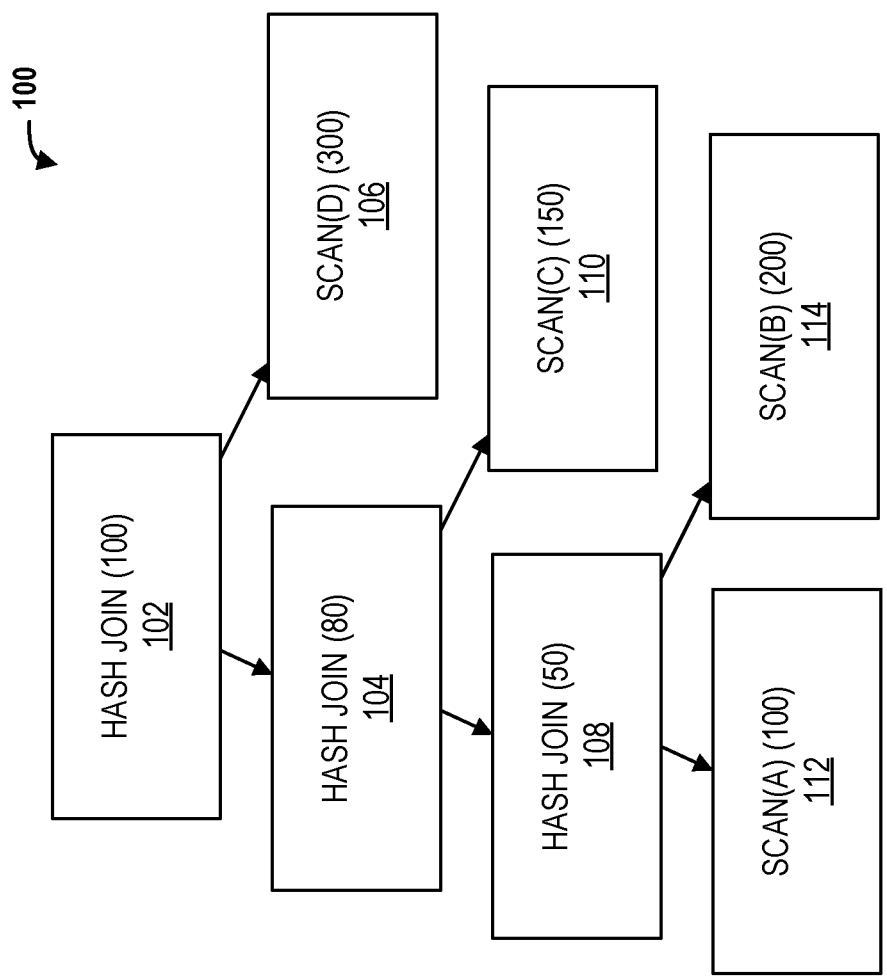
FIG. 1A is an example query execution plan for a query.
Figure 1B:
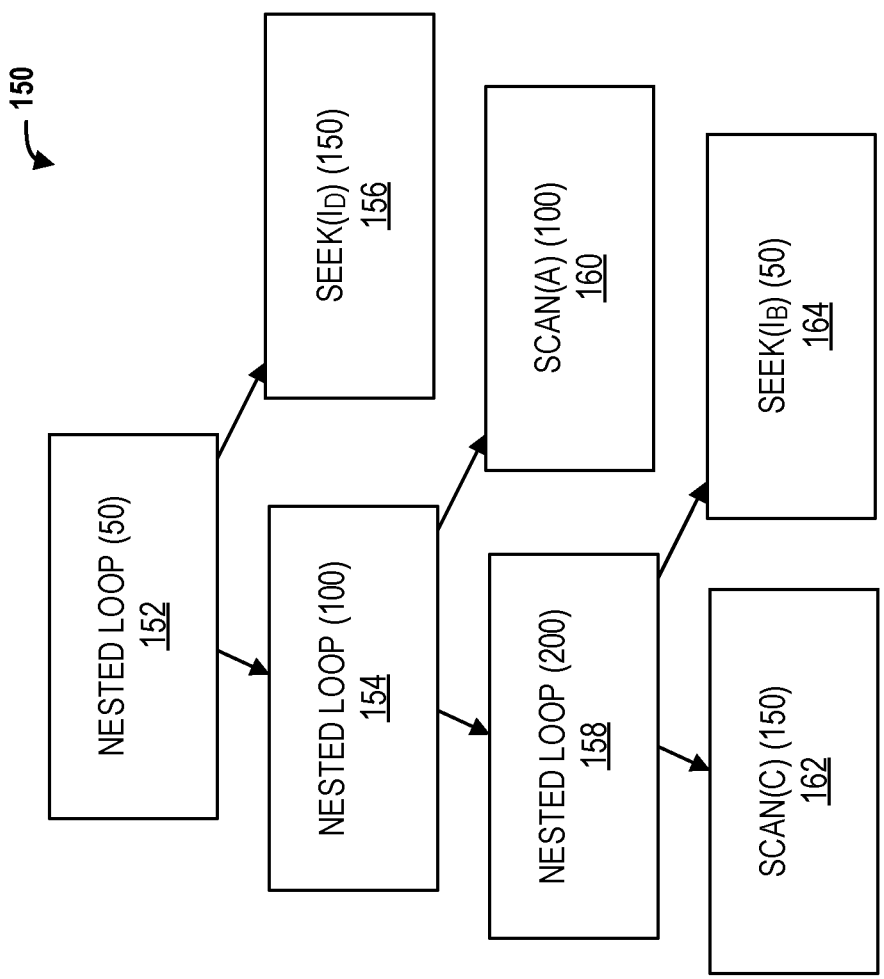
FIG. 1B is another query execution plan for the query using indexes.

As an example, consider a query that joins four relations A, B, C, and D, and consider a specific instance where a new query execution plan is chosen due to new secondary indexes created on B and D. FIG. 1A is an example query execution plan 100 for a query that joins four relations A, B, C, and D. FIG. 1B is another query execution plan 150 for the query using the new secondary indexes.

In the absence of the indexes, the optimizer chooses Hash Joins (HJs) 102, 104, and 108 with Table Scans on all the relations 106, 110, 114, and 112 and a join order of A, B, C, and D. In the presence of the indexes in FIG. 1B, the optimizer decides to join C 162 and B 164 first with a Nested Loop Join (NLJ) 158, accessing B using Index Seek 164. It then joins A 160 with another NLJ 154 and finally joins D 156 with an NLJ 152 again using an Index Seek on D 156. Based on the optimizer's cost estimates, which are listed in parenthesis in FIGS. 1A and 1B, the new query execution plan 150 is cheaper than the previous plan 100. However, on a live system due to cost misestimates on the joins of (C, B, A) by the optimizer, the query execution plan 150 may end up with higher actual execution cost. Reverting back to the query execution plan 100 corrects the increase in execution cost due to the query execution plan 150. However, this approach misses an even better plan that combines the subplans from the query execution plan 100 and the query execution plan 150.

Figure 2:
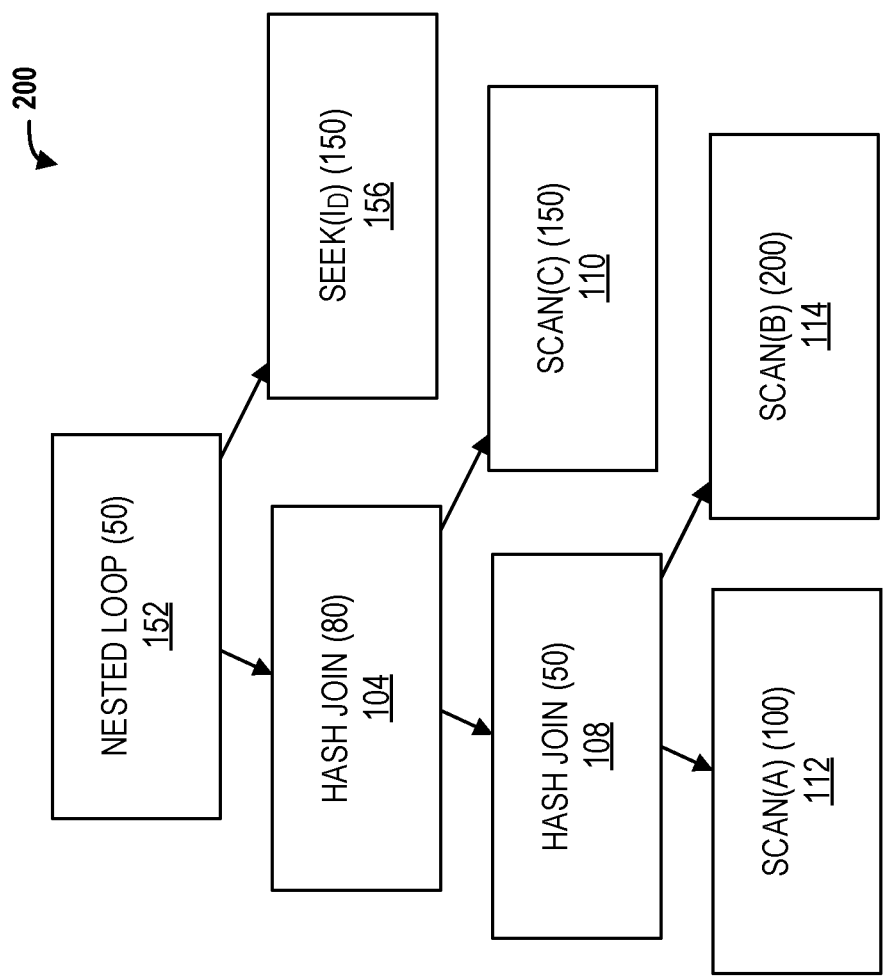
FIG. 2 is a stitched query execution plan for the query in accordance with respective examples.

FIG. 2 is a stitched query execution plan 200 for the query in accordance with respective examples. Combining the joins of A, B, and C 104 and 108 from the query execution plan 100 and the root NLJ 152 and Index Seek on $I_D$ 156 from the query execution plan 150 results in the query execution plan 200 that has a lower execution cost compared to both the query execution plan 100 and the query execution plan 150. While the stitched query execution plan 200 has not been executed previously, the query execution plan 200 includes subplans with observed execution cost from previously-executed query execution plans. Thus, executing the combined plan has a comparable low risk as reverting back to the query execution plan 100.

Various embodiments opportunistically construct a query execution plan from previously-executed query execution plans of the same query. The query execution plan constructed may be different from and cheaper than all the existing previously-executed query execution plans. In an example, the query execution plan includes subplans from different query execution plans that have all previously been executed.

Harnessing efficient subplans from multiple plans has challenges. First, discovering efficient subplans from multiple complicated query execution plans which may consist of hundreds of operators may be difficult or take a long time. Second, even after such efficient subplans are identified, combining the access paths, physical operators, and join orders from these subplans into a single valid plan is also challenging.

In an example, both these challenges may be addressed by formulating the problem as a plan search problem similar to a traditional query optimization but in a constrained search space. In an example, each physical operator in this constrained search space appears in a previously-executed query execution plan of the same query with the same logical expression. In addition, subplans from the previously-executed query execution plan should be valid in the current database configuration. Various embodiments discover efficient subplans by comparing alternative subplans of the same logical expressions in the constrained search space. These efficient subplans may then be combined into the cheapest plan in execution cost using an efficient, quadratic time algorithm using dynamic programming In addition, the optimizer's plan choice may be influenced using the plan forcing feature supported by commercial databases. This forcing step also validates the correctness of the constructed query execution plan.

Referring back to the example in FIGS. 1A, 1B, and 2, embodiments constrain the plan search space to only subplans executed in the query execution plans 100 and 150, such as joining A, B, C using either (A, B, C) with HJs 102, 104, and 108 or (C, B, A) with NLJs 152, 154, and 156. Other possible joins, such as Merge Join or any other join order will not be included in the constrained search space since those do not appear in any of the previously executed query execution plans 100 and 150. Based on operator-level execution costs of the query execution plans 100 and 150, various embodiments combine the root NLJ 152 and Index Seek 156 on the newly created index $I_D$ from the query execution plan 150, with the subplan of joining (A, B, C) 104 and 108 from the query execution plan 100. The query execution plan 200 has the lowest overall execution cost possible from this constrained search space, which is cheaper than both the query execution plans 100 and 150. In addition, the query execution plan 200 has not been previously run to implement the query. The query execution plan 200, however, is made up of subplans from the query execution plans 100 and 150 that have all been previously run. Accordingly, the execution cost of the query execution plan 200 may be calculated from actual execution costs of the previously run subplans.

Embodiments have the same desirable properties as reversion-based plan correction. Embodiments are automatic, have low-overhead, and have low-risk. Similar to reversion-based plan correction, embodiments rely on observed execution costs, rather than estimated execution costs, which lowers the risk that the correction will be lead to slower or more expensive query execution plans. Lowering this risk is important for automatic plan correction at a large scale such as in an automatically indexed cloud-scale database service. In contrast, most prior work on leveraging feedback from execution applies feedback to general query optimization and considers subplans that have never executed before, which introduces an increased risk of estimation errors for the selected plan's execution cost.

The problem solved by various embodiments may be stated as given a query instance q, the set of indexes $[I_k]$ available in the current database configuration C, and a set P of distinct query execution plans $\{p_i\}$ of q which have per-operator execution costs recorded from past executions, embodiments construct a plan p for the query q that has a cheapest execution cost with the constraint that each operator in p can be found in some plan $p_i \in P$.

The word stitching as used herein refers constructing p using operators from different plans in $p_i$, and the resulting plan p as the stitched plan. Execution cost measures, such as CPU time consumed by the query or number of logical reads performed by the query, or some other measure which is proportional to the logical amount of work done by the query, may be used to determine execution costs of subplans.

Figure 3:
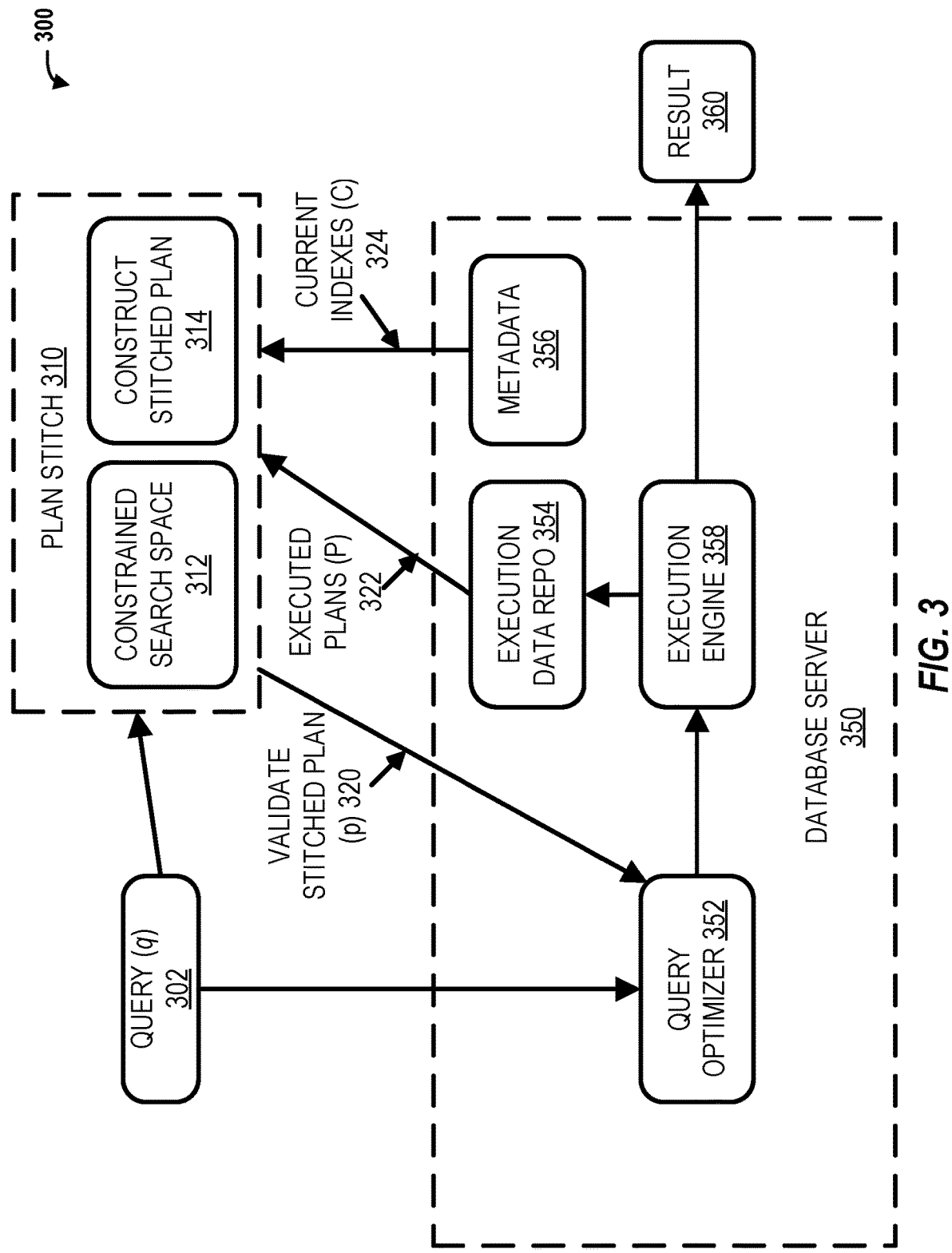
FIG. 3 is a block diagram of a system for stitching query execution plans in accordance with respective examples.

FIG. 3 is a block diagram of a system 300 for stitching query execution plans in accordance with respective examples. In an example, a plan stitch 310 component may operate outside of a database server 350. The plan stitch 310 component may execute outside the critical path of the query optimization and execution. For example, the plan stitch 310 component may be an external client or a background thread in the database server 350. In another example, the plan stitch 310 component may be integrated into the database server 350 or into a query optimizer 352. The query optimizer 352 selects a query execution plan for a query 302 for the current configuration of the database. The current configuration of the database may be determined from metadata 356 associated with and maintained by the database server 350. The metadata 356 may include information regarding available indexes, tables, views, stored procedures, etc. The selected query execution plan may be executed by an execution engine 358. Execution statistics may be stored in an execution data repository 354. The execution statistics may include the query execution plan structure and its operator-level execution costs. After multiple different query execution plans have executed by the execution engine 358, the execution data repository 354 will include execution costs for the different query execution plans for the query 302.

When multiple query execution plans for the query q 302 have executed and whose execution statistics are available in the execution data repository 354, the plan stitch 310 may execute to search for alternative stitched query execution plans which could reduce the execution cost compared to the query execution plan currently chosen by the query optimizer 352. Once triggered, the plan stitch 310 may obtain input plans P 322 from the execution data repository 354 and may read current indexes C 324 from the database metadata 356. The final stitched query execution plan p 320 generated by the plan stitch 310 may then be passed to the query optimizer 352 so that the stitched query execution plan 320 may be used for future executions of the query q 302.

In an example, the plan stitch 310 may influence the query optimizer 352 to use final stitched query execution plan p 320 as the query execution plan for the query 302 using an application programming interface (API). The API may allow specifying a query hint for the query 302. The query execution plan structure fully specifies the logical tree structure and the physical operators for the query 302. The query optimizer 352 may take the hint as a constraint to prune its search space during the plan search, thus generating the query execution plan 320 which conforms to the hint and is guaranteed to be a valid plan for the query 302.

The plan stitch 310 component may include two parts: (a) using the set of previously-executed plans P 322 to identify and encode a constrained search space 312 for stitched plans; and (b) using per-operator execution cost from query execution plan $p_i$ and the constrained search space, construct the stitched plan 314 with minimum total execution cost. As noted above, the execution cost may include a CPU time, logical reads, network bandwidth, memory usage, or any combination of these.

In an example, the plan stitch 310 component constrains the query execution plan search space to operators which have appeared in at least one $p_i$. Some challenges in generating this constrained search space are: (a) identifying the equivalent subplans from the different plans $p_i$; and (b) compactly encoding these matches and constraints in a structure to allow an efficient search.

In an example to identify equivalent subplans, every node in a query execution plan (along with the subplan rooted at the node) represents a logical expression with the required physical properties, e.g., A⋈B⋈C with a sort order. Two subplans are considered equivalent if the subplans have the same logical expression and the required physical properties. A group of equivalent subplans is referred to as an equivalent subplan group.

To find equivalent subplans across plans in P, the equivalence of the logical expressions for subplans is needed. This problem, however, is known to be undecidable. Therefore, in an example, heuristics are used to perform this match. The query optimizer 352 may also need to solve a similar problem, and often relies on techniques such as applying transformation rules to rewrite expressions to check for equivalence. In an example, a similar approach may be used to identify equivalent subplans. Using this approach, however, creates duplication of the transformation and expression rewriting logic outside the optimizer, which is expensive in terms of engineering investments and maintainability. In one example, example heuristics are used that provide a reasonable balance between ease of implementation, overhead, and accuracy of matches. Since the query optimizer 352 may implement a broader class of transformation rules to perform matching, heuristics are used to provide candidate matches and the query optimizer 352 may be used to ensure correctness of a stitched plan as a side-effect of forcing a query execution plan using query hints. If the stitched query execution plan is successfully forced into use, the stitched query execution plan is guaranteed to be a valid plan of the query.

In an example, the following heuristics are used to determine matches between subplans: (a) rule out subplans which can never be equivalent (e.g., different joined tables, or not matching interesting orders), (b) consider candidate matches where the necessary conditions are met (e.g., the joined tables, sort order of output columns etc.); and (c) match expressions computed in the query wherever possible by comparing the expression trees. In addition, when the query optimizer 352 generates single-threaded (i.e., serial) and multi-threaded (i.e., parallel) plans for the same query, the serial or parallel mode is also considered as required physical properties, since equivalent serial and parallel nodes may not be interchangeable across plans.

In example, the constrained search space of allowed alternative plans is stored and represented using an AND-OR graph. The graph may include AND and OR nodes where each node represents whether the respective subplans should be used simultaneously (AND) or are mutually exclusive (OR). Each AND node corresponds to a physical operator in a query execution plan, e.g., Hash Join. Every OR node represents a logical expression with the required physical properties. The children of an AND node are OR nodes, representing logical expressions and required physical properties of the AND node's child subplans. The children of an OR node are AND nodes, representing the root physical operators of alternative subplans of the OR node.

To construct an AND-OR graph, for every subplan rooted at a physical operator in $p_i$, the equivalent subplans from $p_j$ ∈ P are found. After identifying the equivalent subplans, an OR node is created representing the logical expression and required physical properties for an equivalent subplan group. The root physical operator of each subplan in the group corresponds to a child AND node of the OR node.

Figure 4:
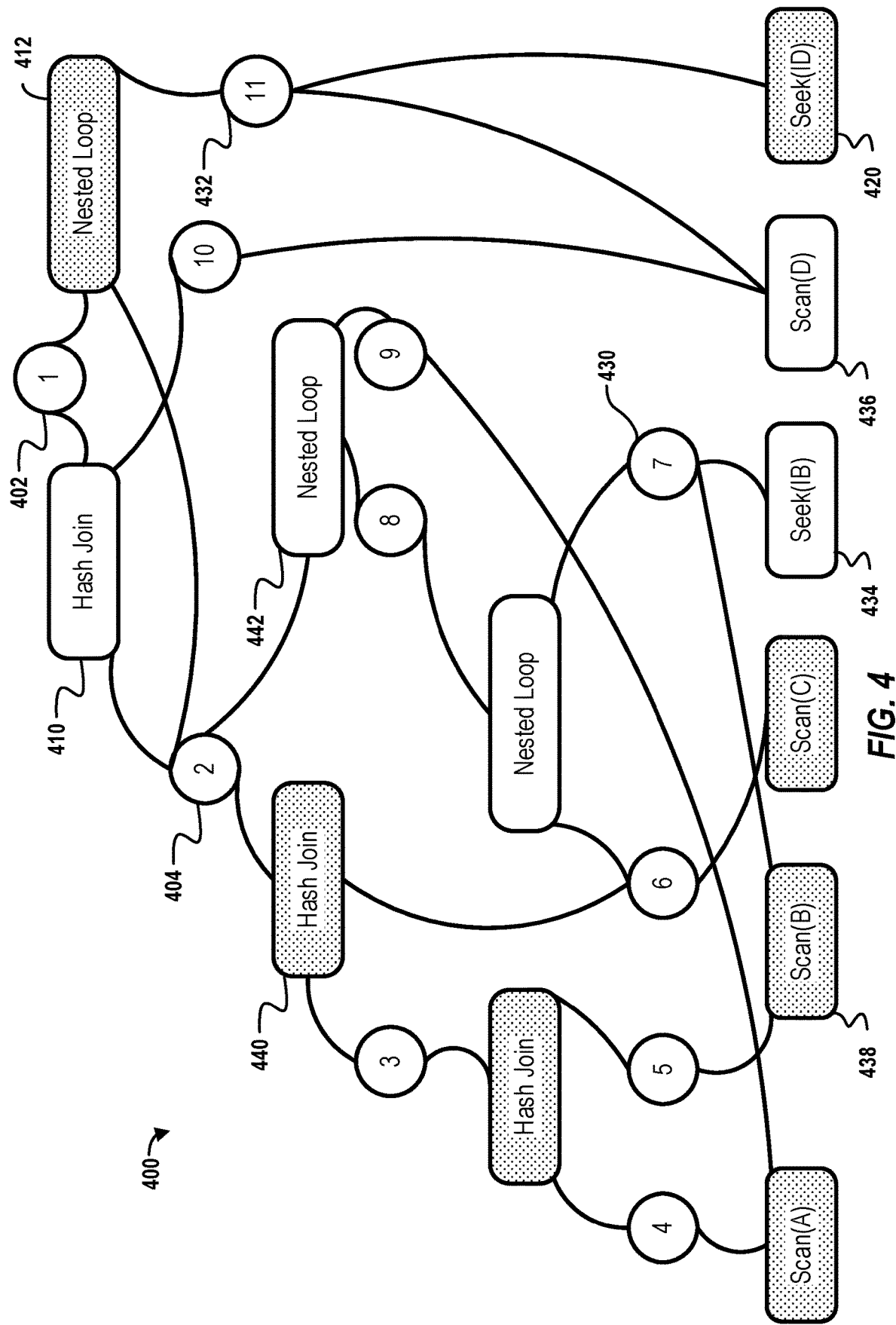
FIG. 4 shows an AND-OR graph constructed from the two alternative query execution plans along with a current configuration of indexes on B and D.

Consider the example query joining relations A, B, C, and D shown in FIG. 1A and FIG. 1B. FIG. 4 shows an AND-OR graph 400 constructed from the two alternative query execution plans along with a current configuration of indexes on B and D. OR nodes are shown as circles and AND nodes are shown as rounded rectangles. Every physical operator in the AND-OR graph, represented by an AND node, has been executed with exactly the same logical expression from either the query execution plan 100 or the query execution plan 150. For example, the root OR node 1 402 of the graph 400 has two alternatives, the root HJ 102 from the query execution plan 100 as AND node 410 and the root NLJ 152 from the query execution plan 150 as AND node 412. Similarly, the left subplans of the two root physical operators have the same logical expression, i.e., joining A, B, and C, they share the same OR node 2 404. This OR node 404 has two alternatives: joining (A, B, C) with HJs from the query execution plan 100 and joining C, B, A with NLJs from the query execution plan 150.

Note that not all the leaf operators from previously-executed plans will appear in the corresponding AND-OR graph. If a leaf operator uses an access path that is not available in the current configuration of the database, the operator is not valid and does not appear in the graph. For instance, if the index $I_D$ is dropped from the configuration, the Index Seek $I_D$ 156 from the query execution plan 150 will not be valid and thus the corresponding AND node 420 will be removed from the AND-OR graph in FIG. 4.

There are two important properties of the AND-OR graph that enables efficient search. First, the graph is acyclic which enables constructing the cheapest plan recursively from the bottom up. Since each query execution plan is tree-structured, the physical operators and the subplans rooted at these operators are partially ordered within a query execution plan. Consequently, the operators are partially ordered across plans; otherwise, there exists two equivalent operators in the same plan, where one operator is the ancestor of the other, which is not possible. Since all the operators are partially ordered across plans, the AND-OR graph is acyclic.

Second, there is at least one OR node, the root OR node 402 shared by all the plans of the query. Because all the plans execute the same query, the plans themselves are logically equivalent and their root physical operators share the same root OR node. This implies that the AND-OR graph embeds all the previously-executed plans that are still valid from the same OR root. Thus, the cheapest plan constructed from this constrained search space has execution cost that is no higher than the cheapest plan among all the valid previous plans.

In an example, the cheapest plan is constructed from leaf AND nodes to the root OR node by stitching the cheapest subplan for each AND node and each OR node in the AND-OR graph. In an example this may be done using dynamic programming. At the leaf-level, each node is an AND node and the corresponding operator becomes the cheapest subplan of the AND node by itself. The cheapest stitched subplan of an OR node is the cheapest one from the cheapest stitched subplans of all its alternative AND nodes. To get the cheapest stitched plan rooted at an AND node, the cheapest stitched subplans of its children OR nodes are taken and stitched as child subplans to the corresponding physical operator of the AND node. Finally, the cheapest plan of the query is the cheapest stitched subplan at the root OR node.

To stitch the cheapest subplan, the execution cost of alternative choices of candidate stitched subplans are compared. Since a stitched subplan may not have been executed in its entirety from previously-executed plans, the observed execution cost of the operators in the stitched subplan are combined recursively. When stitching the cheapest subplan of a child OR node to a parent AND node, the execution cost of the resulting stitched subplan is estimated by combining the cost of child operators with the cost of the parent, similar to how the query optimizer combines its costs estimates and propagates the estimates through the query execution plan:

stitchedSubplanUnitCost(opCost, execCnt, {(childSubplanUnitCost, childExecCnt)})

In an example, stitchedSubplanUnitCost estimates the execution cost of executing a stitched subplan rooted at a physical operator op once. This estimate may take four inputs: the observed execution cost of op, how many times this subplan is executed, the estimated execution cost of executing each of its stitched child subplan once, and how many times each of its original child subplan executes. Most subplans are executed only once in a query execution plan, except if the subplan appears on the inner side of some ancestor Nested Loop Join operator.

By constraining the search to operators that have executed, the execution cost of the stitched plan may be combined and estimated with high accuracy. The above cost measures may use logical cost measures, e.g., CPU time or logical reads, or any other cost measure which accurately represents query execution costs.

In an example, to simplify combining execution costs for a stitched query execution plan, a few assumptions and approximations may be made. First, the execution cost of an operator is assumed transferrable from one subplan to another, provided its input and output are unchanged and is performing the same logical operation. This follows from the observation that the operator implementations are deterministic. Second, for subplans with multiple executions, the execution costs are divided evenly among executions. While this approximation can introduce errors in cost estimation, in practice across a variety of workloads, this factor does not introduce noticeable errors in execution cost calculations.

As an example of stitching a query execution plan, consider the graph 400 in FIG. 4. Starting from leaf nodes, where OR node 7 (430) and OR node 11 (432) have alternative choices. As the cheapest subplan of the group, OR node 7 (430) chooses Seek($I_B$) 434 over Scan(B) 438 and OR node 11 (432) chooses Seek($I_D$) 420 over Scan(D) 436. The selection of an AND node may be made based on the execution cost values shown in FIG. 1A and FIG. 1B. In this example, the Seek($I_D$) 156 operation from FIG. 1B has a smaller execution cost of 150 compared to the execution cost 300 of the equivalent subplan 106 from FIG. 1A. Similarly, at children AND nodes 440 and 442 of OR node 2 (404), the cheapest stitched subplan rooted at the Hash Join 440 is cheaper than its equivalent stitched subplan rooted from the Nested Loop Join 442, and thus the former becomes the cheapest stitched subplan of the OR node 2 (404). Continuing the stitching of the cheapest subplans for AND nodes and OR nodes upwards, eventually, to the root OR node 1 (402) where the cheapest stitched subplans from the top HJ 410 and the top NLJ 412 is selected based on execution costs that may be retrieved from the execution data repository 354. The HJ 420 node is selected and stitched together with the stitched subplan from lower nodes in the graph to create a stitched execution query plan. FIG. 4 shows the resulting cheapest stitched query execution plan with the dotted background node. The other nodes with no background have been executed in the past, but are not part of the stitched query execution plan.

Below in TABLE 1 is an example algorithm to create a stitched query execution plan.

TABLE 1

Input: A set of query execution plans P, a set of indexes I present in the current configuration, and the AND-OR graph G constructed from P
Output: The cheapest stitched query execution plan
// Order the equivalent subplan groups from bottom to top
1 G' ← GetOrderedSubplanGroups(G)
// Construct the cheapest stitched plan using dynamic programming
2 for g(or) in G' do
3   bestSubplanInGroup(g(or)) ← NULL
4   bestCost ← ∞
5   for op in g(or) do
6     if op is leaf operator then
7       bestSubplanUnitCost(op) ← opUnitCost(op)
8       bestSubplan(op) ← A single operator op
9     else
10      bestSubplan(op) ← op
11      for $or_k$ in op's child OR nodes do
12        bestSubplan(op) ← StitchbestSubplanInGroup($or_k$) to op
13      end
14      bestSubplanUnitCost(op) ← stitchedSubplanUnitCost(opCost(op), execCnt(op), {bestSubplanUnitCost($or_k$), execCnt(op, $or_k$)})
15      if bestSubplanInGroup(g(or)) = NULL or bestCost > bestSubplanUnitCost(op) then TABLE 1-continued

```
16           bestSubplanInGroup ← bestSubplan(op)
17           bestCost ← bestSubplanUnitCost(op)
18        end
19 end
20 return bestSubplanInGroup(g_root)
```

In the algorithm above, let G be an AND-OR graph constructed from previously-executed query execution plans. In an example, the graph has all invalid operators removed. For each AND node and, there are two states: the cheapest stitched subplan bestSubplan(and) with root operator op and the estimated execution cost bestSubplanUnitCost(op) of executing bestSubplan(and) once. For each OR node or and its corresponding equivalent subplan group g(or), the cheapest stitched subplan in the group as bestSubplanInGroup(g(or)), which is the cheapest stitched subplan among all the bestSubplan(and), where and is a child AND node of or.

Subplans are stitched from the bottom up (line 1 in TABLE 1). If op is a leaf operator (lines 6-8 in TABLE 1), the bestSubplan(op) is op itself and bestSubplanUnitCost(op) is the cost of executing op once. If op is an internal operator (lines 10-14 in TABLE 1), for the equivalent subplan group of every OR child node $g(or_k)$, the subplan bestSubplanInGroup($g(or_k)$) is stiched to op. The bestSubplanUnitCost is computed with the costing API as stitchedSubplanUnitCost(opCost(op), execCnt(op), {bestSubplanUnitCost($or_k$), execCnt(op, $or_k$)}), where execCnt(op, $or_k$) is how many times the child subplan rooted at $or_k$ is executed when the subplan rooted at op is executed once.

After constructing the cheapest stitched subplan rooted at op, bestSubplanInGroup(g(or)) is updated accordingly (lines 15-17 in TABLE 1). Finally, the cheapest stitched subplan of the root group (i.e., bestSubplanInGroup($g_{root}$)) is returned as the cheapest stitched plan from the AND-OR graph G.

In an example, a stitching implementation may monitor query executions on a DBMS. Statistics may be retrieved from the DBMS that provide previously-executed query execution plans, properties of operators, and operator-level execution costs. A process may determine when multiple query execution plans are available for a query and initiate the stitching implementation based on the available multiple query execution plans.

In an example, the algorithm in TABLE 1 may be implemented in C#. Known DBMS systems may also be used to access previously executed query execution plans, execution statistics, plan structures, properties of operations, and operator-level execution costs. In an example, when a query has multiple query execution plans, the plan stitch component may run to determine if a more efficient or less costly query execution plan may be constructed from the previously run multiple query execution plans.

A stitched query execution plan needs to be valid for the current configuration of the database to be executed. In an example, the query optimizer performs the validation. In an example, the query optimizer may determine that a stitched query execution plan is not valid. An invalid query execution plan may be handled with a two-stage stitch approach. When a stitched query execution plan is invalid and the corresponding plan forcing fails, a second stitching attempt may be done with different parameters. This may be referred to as a sparse stitch. A sparse stitch performs a sparser match by eliminating equivalent subplan groups rooted at various operators such as Bitmap and Compute Scalar. These operators may introduce expressions which makes valid matching harder. Intuitively, by reducing the number of equivalent subplan groups, the chance of making a mistake in constructing the constrained search space is reduced and the chance of producing a valid stitched query execution plan is increased. In another example, invalid query execution plans may be handled by iteratively eliminating subplan groups to make the search space sparser until a valid query execution plan which can be forced is found. A sparse stitch does not necessarily sacrifice the quality of the valid stitched query execution plan. The sparse stitch may still benefit from that subplan by stitching a subplan higher up in the plan structure that contains this cheaper subplan.

An experiment was run testing one embodiment that used to stitch query execution plans for queries. The query execution plans from multiple workloads were used in the experiment. In the experiment, the CPU time consumed during execution of a query was measured and the stitched query execution plans resulted in at least 10% reduction in CPU time consumed for 40% to 83% of the improved query execution plans across all tested workloads. A reduction of at least 50% CPU time consumed was achieved in 25% of the improved query execution plans from one workload. The estimated execution costs based on previously executed metrics was found to be within 20% of the actual CPU time consumed for 70% to 85% of the stitched query execution plans across all test workloads. In addition, up to 33% of query execution plans achieved reduced CPU execution times after queries were optimized by stitching together new query execution plans. The experiment also found that more than 63% of the stitched query execution plans had different plan structures compared to the original query execution plan. In addition, four or less previously-executed plans were used to construct cheaper query execution plans for 53% to 80% of the query execution plans across all tested workloads. Accordingly, benefits of a stitched query execution plan may be achieved with only a few previously executed query execution plans for a query. Known query optimizers missed finding cheaper plans due to aggressive pruning in the search strategy and errors in cost estimates for plans.

Figure 5:
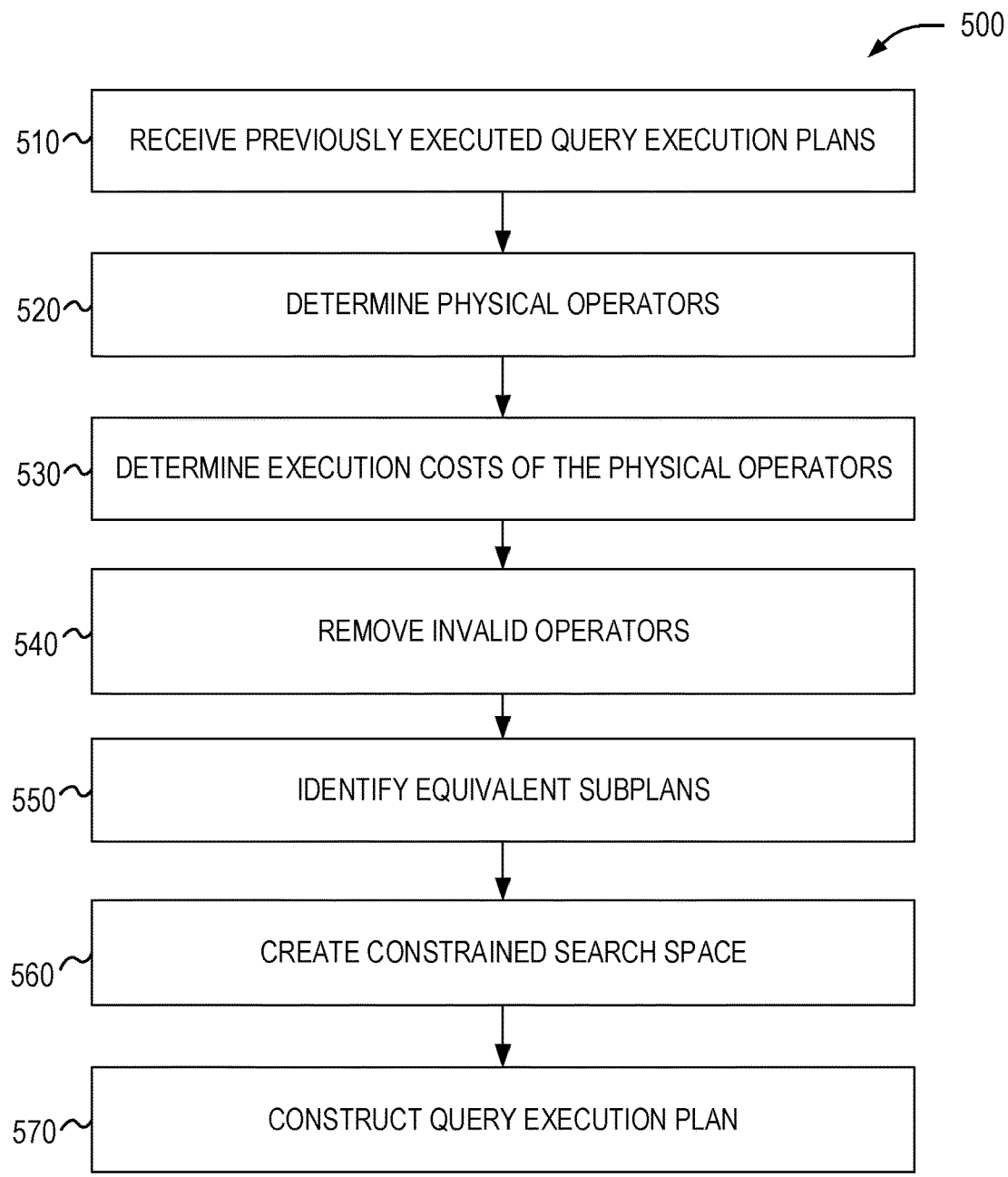
FIG. 5 is a flow diagram of a process for constructing a query execution plan for a query in accordance with respective examples.

FIG. 5 is a flow diagram of a process for constructing a query execution plan for a query in accordance with respective examples. The process 500 may be executed on a computing device. At 510, a set of previously executed query execution plans for the query are received. The previously executed query execution plans may be stored as metadata in a database management system. In an example, the query execution plans are requested and received from the database management system. Each of the previously executed query execution plans includes subplans. Together the subplans make up the operations done to implement the query. In an example, each subplan indicates a tree of physical operators that are ran to implement the query. At 520, physical operators executed in the set of previously executed query execution plans are determined. In an example, a physical operator implements the operation described by a logical operator. Physical operators may access columns, rows from a table, an index, or a view. Physical operators may also do other operations such as calculations, aggregations, or joins.

At 530, for each of the physical operators, an execution cost for the physical operator is determined based on the previously executed query execution plans. In an example, the execution cost for a physical operator may be the CPU execution time or the I/O reads done for that operator. The execution cost may be determined from a data execution repository maintained by the database. The execution cost may be determined from measured costs from running the operation. For example, the execution cost may be the average of measured execution cost for the physical operator. The measurements may be taken when the previously executed query execution plans were run. The execution cost of a subplan may be a sum of the execution costs of all operators within the subplan.

At 540, invalid operators are removed from the from the previously executed query execution plans. An operator may be invalid based on the configuration of the database. For example, a subplan may include an operator that accesses a view that was available when the subplan was run. The view may have been removed from the database after the subplan was run. Accordingly, any operator that accesses the removed view will no longer be valid and will be removed. The available views and indexes in a database may requested from and received from the database. In an example, operators that access a physical artifact that does not exist in the database are identified. Each of these operators is considered invalid and removed. In an example, a physical artifact maybe an index or a materialized view.

At 550, equivalent subplans from the previously executed query execution plans are identified based on physical properties and logical expressions of the subplans. In an example, subplans are considered equivalent if they have the same logical expression and the required physical properties. Logical expressions may include what tables are joined and how they are joined. Physical properties may include parallel or serial execution, sort order, etc.

At 560, a constrained search space is created based on the equivalent subplans. In an example, the constrained search space may include only valid subplans from the previously executed query execution plans. In an example, the constrained search space may be represented as a tree with AND and OR nodes as described above.

At 570, a query execution plan for the query is constructed from the constrained search space based on the execution cost of the physical operators. In an example, the constructed query execution plan was not a query execution plan that was previously executed by the database. In an example, the query execution plan is constructed by determining, for each of the equivalent subplans, operators executed in the each of the equivalent subplans. Then, for the each of the equivalent subplans, a subplan execution cost based on the execution costs of the operators is determined. A subplan from the equivalent subplans is selected based on the subplan execution costs. In an example, the subplan with the lowest total execution cost is selected. The query execution plan may be viewed as including multiple subplans. The subplans in the query execution plan may be from different previously executed subplans. Alternatively, the query execution plan may be viewed as including operators from multiple different previously executed subplans.

In addition, the constructed query execution plan may be forced on a query optimizer of the database. In an example, the constructed query execution plan may be forced by limiting the query optimizer's search space such that a query execution plan that conforms to the constructed query execution plan is found by the query optimizer. The query optimizer may then provide the query execution plan found which conforms to the constructed query execution plan such that the database uses this query execution plan to execute the query.

In an example, the query optimizer may validate the constructed query execution plan. Accordingly, the query optimizer may determine that the constructed query execution plan is not a valid plan. When this happens, the query optimizer associated with the database, may provide an indication that the query execution plan is invalid. To handle an invalid query execution plan, certain equivalent subplans may be removed from the search space. Using this updated search space, another query execution plan may be constructed. This additional query execution plan may not have previously been executed on the database to implement the query. The query optimizer may be used to validate this additional query execution plan as well.

Figure 6:
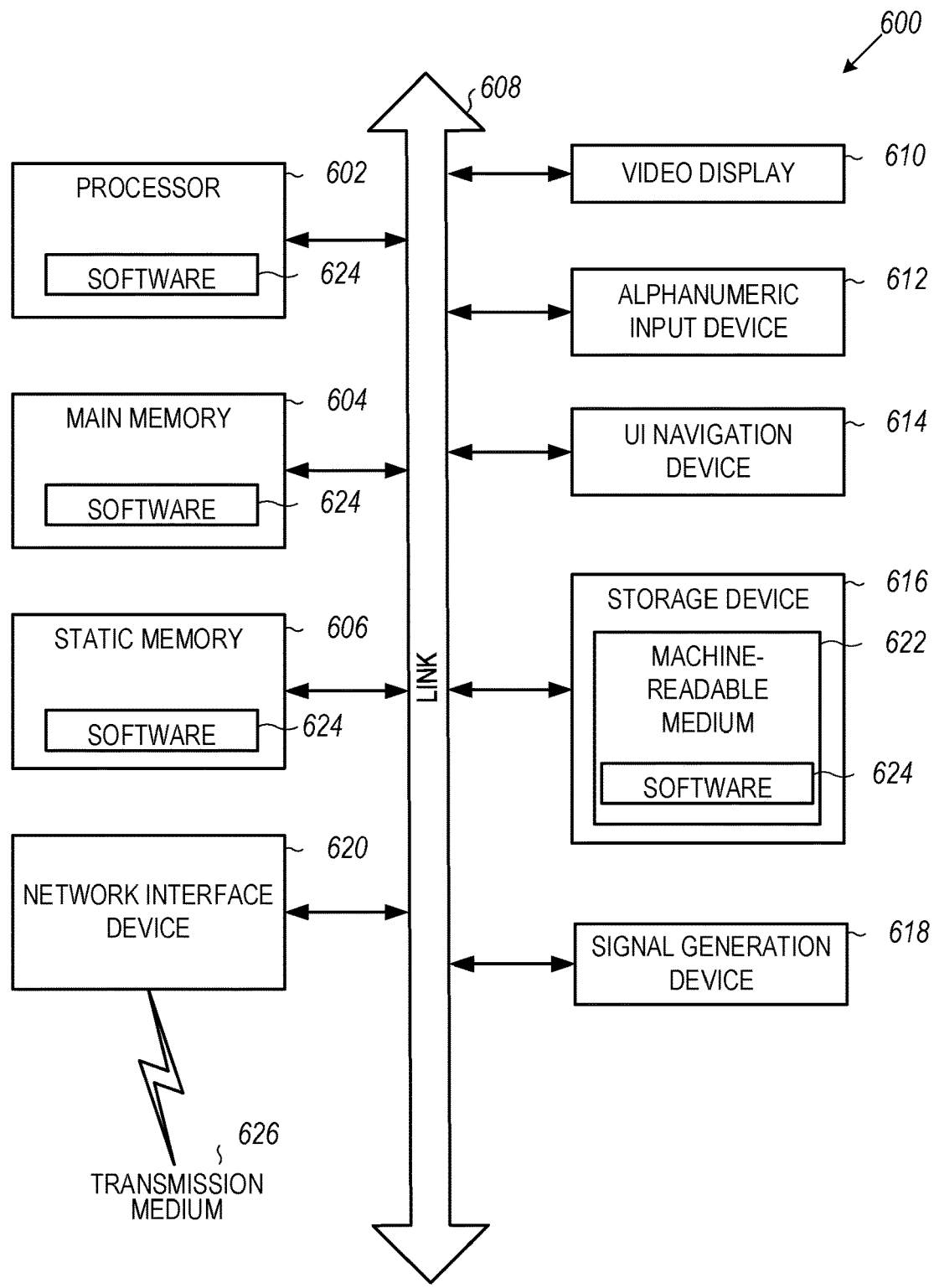
FIG. 6 is an example computing device that can be used in conjunction with the technologies described herein.

FIG. 6 is an example computing device that can be used in conjunction with the technologies described herein. In alternative embodiments, the computing device 600 may operate as a standalone device or may be connected (e.g., networked) to other computing devices. In a networked deployment, the computing device 600 may operate in the capacity of a server communication device, a client communication device, or both in server-client network environments. In an example, the computing device 600 may act as a peer computing device in peer-to-peer (P2P) (or other distributed) network environment. The computing device 600 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device 600 may be an implementation of the database server 350, may implement the plan stitch 310 component, and perform the method of FIG. 5.

Computing device 600 may include a hardware processor 602 (e.g., a central processing unit (CPU), a graphics processing unit (GPU), a hardware processor core, or any combination thereof), a main memory 604 and a static memory 606, some or all of which may communicate with each other via a link (e.g., bus) 608. The computing device 600 may further include a display unit 610, an input device 612 (e.g., a keyboard), and a user interface (UI) navigation device 614 (e.g., a mouse). In an example, the display unit 610, input device 612, and UI navigation device 614 may be a touch screen display. In an example, the input device 612 may include a touchscreen, a microphone, a camera (e.g., a panoramic or high-resolution camera), physical keyboard, trackball, or other input devices.

The computing device 600 may additionally include a storage device (e.g., drive unit) 616, a signal generation device 618 (e.g., a speaker, a projection device, or any other type of information output device), a network interface device 620, and one or more sensors, such as a global positioning system (GPS) sensor, compass, accelerometer, motion detector, or other sensor. The computing device 600 may include an input/output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 616 may include a computing-readable (or machine-readable) storage media 622, on which is stored one or more sets of data structures or instructions 624 (e.g., software) embodying or utilized by any one or more of the techniques or functions described herein. In an example, at least a portion of the software may include an operating system and/or one or more applications (or apps) implementing one or more of the functionalities described herein. The instructions 624 may also reside, completely or at least partially, within the main memory 604, within the static memory 606, and/or within the hardware processor 602 during execution thereof by the computing device 600. In an example, one or any combination of the hardware processor 602, the main memory 604, the static memory 606, or the storage device 616 may constitute computing device (or machine) readable media.

While the computer-readable storage media 622 is illustrated as a single medium, a "computer-readable storage media" or "machine-readable storage media" may include a single medium or multiple media (e.g., a centralized or distributed database, and/or associated caches and servers) configured to store the one or more instructions 624.

In an example, a computer-readable storage media or machine-readable storage media may include any medium that is capable of storing, encoding, or carrying instructions for execution by the computing device 600 and that cause the computing device 600 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 620 may use the transfer protocols to transmit data using transitory propagating signals.

In an example, the network interface device 620 may include one or more physical jacks (e.g., Ethernet, coaxial, or phone jacks) or one or more antennas to connect to the communications network 626. In an example, the network interface device 620 may include one or more wireless modems, such as a Bluetooth modem, a Wi-Fi modem or one or more modems or transceivers operating under any of the communication standards mentioned herein. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. In an example, a transmission medium may include any intangible medium that is capable of storing, encoding or carrying instructions for execution by the computing device 600, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method to create a query execution plan for a query of a database, the method comprising:
    receiving, from the database, a set of previously executed query execution plans for the query, wherein each of the previously executed query execution plans comprises subplans;
    determining physical operators executed in the set of previously executed query execution plans;
    determining, for each of the physical operators, an execution cost based on the previously executed query execution plans;
    removing invalid physical operators from the previously executed query execution plans that are invalid for a current configuration the database;
    identifying equivalent subplans from the previously executed query execution plans based on physical properties and logical expressions of the subplans;
    creating a constrained search space based on the equivalent subplans; and
    constructing a query execution plan for the query from the constrained search space based on the execution cost of the physical operators.

2. The method of claim 1, wherein the constructed query execution plan is not within the previously executed query execution plans.

3. The method of claim 2, further comprising forcing the constructed query execution plan on a query optimizer of the database, wherein the database uses the constructed query execution plan to execute the query.

4. The method of claim 1, wherein removing invalid physical operators comprises identifying physical operators that access a physical artifact that does not exist in the database.

5. The method of claim 4, wherein the physical artifact is one of an index and a materialized view.

6. The method of claim 1, further comprising:
receiving, from the database, an indication the constructed query execution plan is invalid;
removing from the constrained search space a first set of equivalent subplans; and
constructing a second query execution plan from the constrained search space that has the first set of equivalent subplans removed based on the execution cost of the physical operators, wherein the second constructed query execution plan is not within the previously executed query execution plans.

7. The method of claim 1, wherein constructing the query execution plan comprises:
determining, for each of the equivalent subplans, operators executed in the each of the equivalent subplans; and
determining, for the each of the equivalent subplans, a subplan execution cost based on the execution costs of the operators and the determined operators executed in the each of the equivalent subplans.

8. The method of claim 7, wherein constructing the query execution plan comprises selecting a subplan from the equivalent subplans based on the subplan execution costs, wherein the query execution plan comprises the selected subplan.

9. The method of claim 1, wherein execution cost means CPU execution time.

10. The method of claim 1, wherein execution cost measures I/O reads.

11. A system for creating a query execution plan for a query of a database, the system comprising an electronic processor configured to:
receive a set of previously executed query execution plans for the query, wherein each of the previously executed query execution plans comprises subplans, each of the subplans indicates a tree of physical operators;
determine physical operators executed in the set of previously executed query execution plans;
determine, for each of the physical operators, an execution cost based on the previously executed query execution plans;
remove invalid physical operators from the previously executed query execution plans that are invalid for the database;
identify equivalent subplans from the previously executed query execution plans based on physical properties and logical expressions of the subplans;
create a constrained search space based on the equivalent subplans; and
construct a query execution plan for the query from the constrained search space based on the execution cost of the physical operators.

12. The system of claim 11, wherein the electronic processor is further configured to force the constructed query execution plan on a query optimizer of the database, wherein the database uses the constructed query execution plan to execute the query.

13. The system of claim 11, wherein to invalid remove physical operators the electronic processor is configured to identify physical operators that access a physical artifact that does not exist in the database.

14. The system of claim 13, wherein the physical artifact is one of an index and a materialized view.

15. The system of claim 11, wherein the electronic processor is further configured to:
receive, from the database, an indication the constructed query execution plan is invalid;
remove from the constrained search space a first set of equivalent subplans; and
construct a second query execution plan from the constrained search space with the removed first set of equivalent subplans based on the execution cost of the physical operators, wherein the second constructed query execution plan is not within the previously executed query execution plans.

16. The system of claim 11, wherein to construct the query execution plan the electronic processor is configured to:
determine, for each of the equivalent subplans, operators executed in the each of the equivalent subplans; and
determine, for the each of the equivalent subplans, a subplan execution cost based on the execution costs of the operators and the determined operators executed in the each of the equivalent subplans.

17. The system of claim 16, wherein to construct the query execution plan the electronic processor is configured to select a subplan from the equivalent subplans based on the subplan execution costs, wherein the query execution plan comprises the selected subplan.

18. A non-transitory computer-readable storage medium storing computer-executable instructions for creating a query execution plan for a query of a database, the stored instructions comprising:
instructions to receive a set of previously executed query execution plans for the query, wherein each of the previously executed query execution plans comprises subplans, each of the subplans indicates a tree of physical operators;
instructions to determine physical operators executed in the set of previously executed query execution plans;
instructions to determine, for each of the physical operators, an execution cost based on the previously executed query execution plans;
instructions to remove invalid physical operators from the previously executed query execution plans that are invalid for the database;
instructions to identify equivalent subplans from the previously executed query execution plans based on physical properties and logical expressions of the subplans;
instructions to create a constrained search space based on the equivalent subplans; and
instructions to construct a query execution plan for the query from the constrained search space based on the execution cost of the physical operators.

19. The computer-readable storage medium of claim 18, wherein the instructions further comprise instructions to force the constructed query execution plan on a query optimizer of the database, wherein the database uses the constructed query execution plan to execute the query.

20. The computer-readable storage medium of claim 18, wherein the instructions to remove invalid physical operators comprise instructions to identify physical operators that access a physical artifact that does not exist in the database.

* * * * *